(12) United States Patent
Scheuring et al.

(10) Patent No.: US 10,837,981 B2
(45) Date of Patent: Nov. 17, 2020

(54) METHOD OF OPERATING AN AFM

(71) Applicants: INSTITUT NATIONAL DE LA SANTÉ ET DE LA RECHERCHE MÉDICALE (INSERM), Paris (FR); UNIVERSITÉ D'AIX-MARSEILLE, Marseilles (FR)

(72) Inventors: Simon Scheuring, New York, NY (US); Atsushi Miyagi, New York, NY (US)

(73) Assignees: INSTITUT NATIONAL DE LA SANTE ET DE LA RECHERCHE MEDICALE (INSERM), Paris (FR); UNIVERSITE D'AIX-MARSEILLE, Marseilles (FR)

(*) Notice: Subject to any disclaimer, the term of this patent is extended or adjusted under 35 U.S.C. 154(b) by 0 days.

(21) Appl. No.: 16/097,970

(22) PCT Filed: Apr. 26, 2017

(86) PCT No.: PCT/EP2017/059959
§ 371 (c)(1),
(2) Date: Oct. 31, 2018

(87) PCT Pub. No.: WO2017/191015
PCT Pub. Date: Nov. 9, 2017

(65) Prior Publication Data
US 2019/0094266 A1     Mar. 28, 2019

(30) Foreign Application Priority Data

May 4, 2016   (EP) .................................... 16305519

(51) Int. Cl.
*G01Q 10/06*   (2010.01)
*G01Q 60/34*   (2010.01)

(52) U.S. Cl.
CPC ........... *G01Q 10/065* (2013.01); *G01Q 60/34* (2013.01)

(58) Field of Classification Search
None
See application file for complete search history.

(56) References Cited

U.S. PATENT DOCUMENTS 4,954,704 A * 9/1990 Elings .................... B82Y 35/00
                                                                  250/306
6,008,489 A   12/1999 Elings et al.
(Continued)

FOREIGN PATENT DOCUMENTS

WO   2013/053968 A1   4/2013

OTHER PUBLICATIONS

Ando et al. "Filming Biomolecular Processes by High-Speed Atomic Force Microscopy", Cehmical Reviews (Year: 2014).*

*Primary Examiner* — Michael J Logie
(74) *Attorney, Agent, or Firm* — W&C IP

(57) ABSTRACT

A method of operating an atomic force microscope, comprising a probe, the probe being moved forth and back during respective trace and retrace times of a scan line, the method comprising: a) during trace time, oscillating the probe, b) generating a z feedback signal to keep an amplitude of oscillation of the probe constant at a setpoint value, the z feedback signal being generated by a first feedback loop, c) during retrace time, placing the probe in a drift compensation state by changing the setpoint value to a different value so that the z feedback signal being generated by the first feedback loop causes the probe to move away from the sample and oscillate free, d) detecting an amplitude of free oscillation of the probe and adjusting with a second feedback loop its excitation signal to maintain the amplitude of free oscillation of the probe close to a set value.

17 Claims, 5 Drawing Sheets

(56) References Cited

U.S. PATENT DOCUMENTS

2003/0001641 A1\* 1/2003 Kim .................. B82Y 35/00
327/165
2005/0066714 A1 3/2005 Adderton et al.

\* cited by examiner

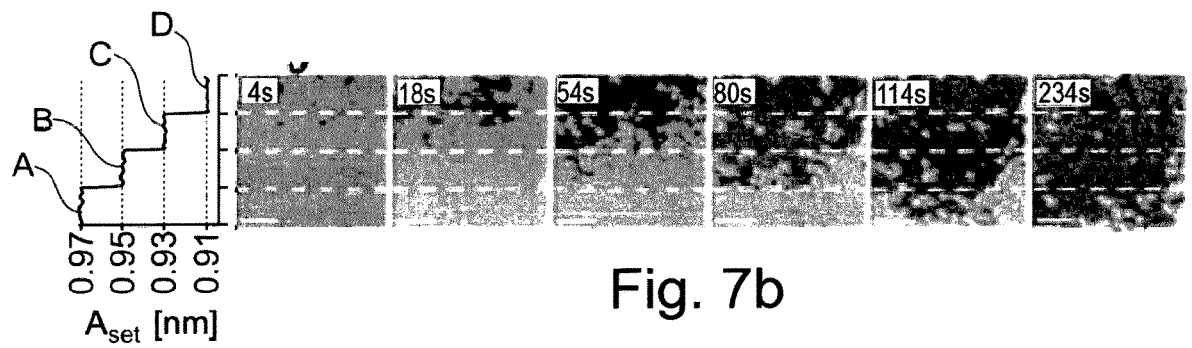
Fig. 7a
Fig. 7b
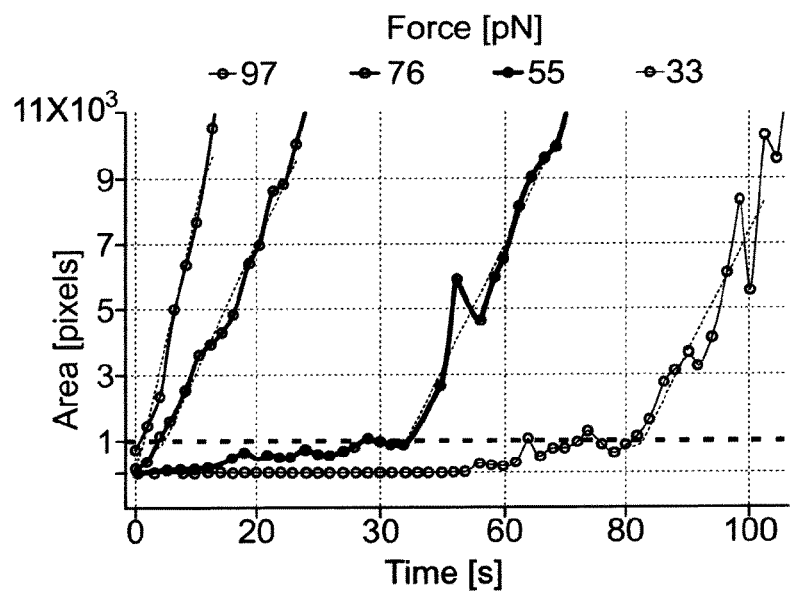
Fig. 8
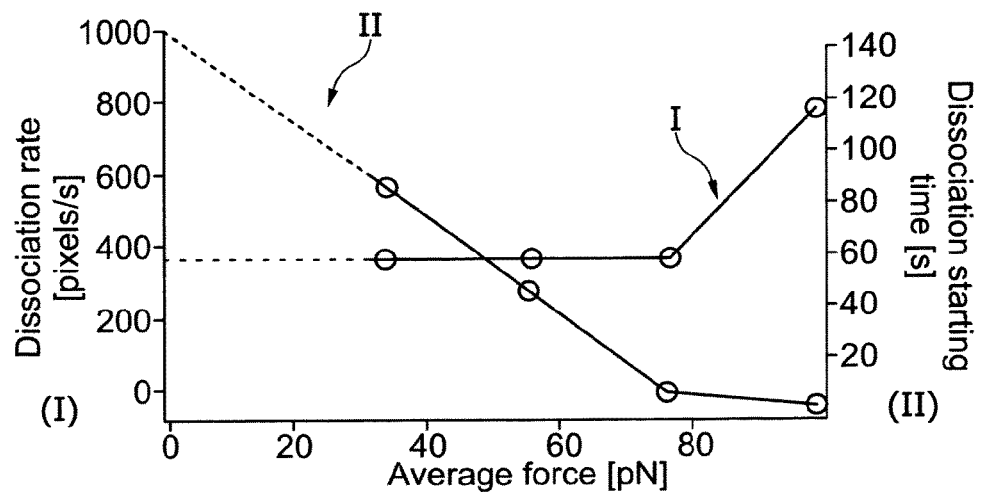
Fig. 9

METHOD OF OPERATING AN AFM

The present invention relates to an atomic force microscope (AFM).

Atomic force microscopy is a widely used imaging tool for biological samples that allows imaging in aqueous environment with nanometer resolution. An AFM typically comprises a probe comprising a cantilever and a tip attached at its end that is used to scan the specimen surface along x lines of an x-y imaging plane.

In amplitude modulation mode of an AFM (also called tapping mode, oscillating mode or intermittent contact mode), the cantilever is excited by acoustic waves sent by an excitation piezo to oscillate in a z direction perpendicular to the x-y imaging plane.

The topography of the sample during scanning causes the interaction between the probe and the sample to vary and thus prompts the amplitude of oscillation to change.

Many AFMs employ a z feedback loop to maintain the amplitude of oscillation of the probe constant. Such a loop receives as input signal a measured imaging amplitude and actuates as output a z servo to vary the distance between the probe and the sample to maintain the imaging amplitude constant.

A properly adjusted z feedback loop adjusts the support-sample separation continuously during the scanning motion, such that the imaging amplitude of the probe remains approximately constant.

In this situation, the z feedback output equals the sample surface topography to within a small error.

Amplitude modulation mode is advantageous because of the quasi-elimination of lateral forces between AFM probe and sample.

However, the excitation efficiency, i.e. how the acoustic waves excite the cantilever, changes permanently. This can be due to buffer evaporation and/or temperature changes and/or other unpredictable factors. For example, if the excitation efficiency rises, the cantilever oscillation amplitude is prone to increase, but the z feedback loop keeps it constant, resulting in a higher force applied on the sample, because the effective oscillation amplitude damping is much higher. On the other hand, if the excitation efficiency is decreased, the cantilever oscillation amplitude tends to decrease and cause as a result the feedback loop to drive the tip out of sample contact.

Several efforts have been made to solve this problem.

A first solution is to make a cross correlation analysis between trace and retrace time of a scan line to detect force-dependent image quality changes.

More frequently the amplitude of the second harmonic of cantilever oscillation is used to detect drift. However, the second harmonic analysis method is not appropriate when scanning soft biological samples, because the oscillation energy dissipates in the system. At very low forces, for example between 10 picoNewton and 200 picoNewton, for example at around 50 picoNewton, the interaction between the tip and the sample changes drastically, leading to a strong decrease and eventual vanishing of the second harmonic.

U.S. Pat. No. 6,008,489 discloses a method comprising placing the probe to a reference position far away from the sample for detection and adjustment of a free oscillation amplitude and returning the probe to an operative state thereafter. In this way, the probe does not interact with sample during detection and adjustment of the free oscillation amplitude and correction of the drift. However, while mentioning creating separation of tip and sample by two ways, i.e. 1. reducing the drive signal of the excitation element; 2. reducing the feedback gains, this patent does not provide much detail on either methods. In the first way, the amplitude would be set smaller than the setpoint amplitude, and the natural reaction of the feedback loop would to retract the sample to establish back the setpoint amplitude. However, this method would not allow measuring the real current free amplitude because by reducing the excitation power to separate the sample and the probe, the free amplitude of the probe thus measured would be according smaller than real free amplitude before reduction of the excitation power. The second way according to which the feedback gains are reduced does not necessarily lead to tip-sample separation. In fact, reducing the gains just renders the feedback slower and less sensitive without necessarily leading to separation if not used in combination with the first way. Moreover, reducing PID feedback gain risks making the process very slow.

US2005/066714 discloses an AFM comprising a first feedback circuit generating a cantilever control signal. The first feedback circuit is nested within a second feedback circuit responsive to the cantilever control signal to generate a position control signal. The second feedback circuit includes a Z position actuator responsive to the position control signal to position the sample.

WO2013/053968 discloses a method for controlling a scanning microscope using two control loops. The first control loop manipulates the amplitude of electrical signal introduced into the actuator to control the amplitude of the micro-cantilever while the second control the previous electrical signal to manipulate the tip-sample distance.

The invention aims to provide a method to compensate for free amplitude drift that is reliable, with quick response time, easy to implement on existing AFMs and well suited for soft biological samples.

Exemplary embodiments of the invention relate to a method of operating an atomic force microscope (AFM), comprising a probe displaceable relative to a sample along scan lines in an imaging x-y plane and along a z axis perpendicular to the x-y plane, the probe being moved forth and back during respective trace and retrace times of a scan line, and caused to oscillate by an excitation signal, the method comprising:

a) during trace time, placing the probe in an operating state in which the probe oscillates along the z axis and interacts with the sample, b) generating a z feedback signal to displace the probe relative to the sample along the z axis to keep an amplitude of oscillation of the probe constant at a setpoint value $A_{set}$, the z feedback signal being generated by a first feedback loop at least on the basis of the setpoint value $A_{set}$ and having as input a measured amplitude value of oscillation of the probe, c) during retrace time, placing the probe in a drift compensation state by changing the setpoint value $A_{set}$ to a different value $A_{set}+A_{mock}$ so that the z feedback signal being generated by the first feedback loop causes the probe to move away from the sample and oscillate free of interaction with the sample, d) detecting an amplitude of free oscillation of the probe and adjusting with a second feedback loop the excitation signal of the probe to maintain the amplitude of free oscillation of the probe close to a set value $A_{free}$, e) returning the probe in interaction with the sample for a next scan line by restoring the setpoint value $A_{set}$ for the generation of the z feedback signal by the first feedback loop while applying the adjusted excitation signal of step d) to the probe.

Thanks to the invention, the proper operation of the microscope no longer depends on tip conditions or sample properties. Even if an organic molecule is attached to the tip, and whatever the sample elasticity from a very soft biological object to a hard mica substrate, the AFM continues adjusting the real applied force with accuracy. Thus the invention performs equally well independently of the hardness of the sample underneath the tip.

According to the invention, $A_{set}$ is controlled by the first feedback loop similarly as in existing AFMs while the free amplitude $A_{free}$ is stabilized thanks to the second feedback loop.

The invention provides a reliable and easy to implement automated force control during imaging in amplitude modulation mode. It makes possible for specialists to perform more accurate experiments. It also allows the development of a self-operating AFM for non-specialists that adjusts and maintains appropriate imaging forces automatically.

Compared to U.S. Pat. No. 6,008,489 which teaches reducing the drive power of the excitation piezo to achieve tip-sample separation, the present invention increases the amplitude setpoint. In this way, the real current free amplitude can be measured, contrary to U.S. Pat. No. 6,008,489.

By "the z-feedback signal is generated to keep the amplitude of oscillation of the probe constant at the value of $A_{set}$", it should be understood that the z-feedback signal always drives the amplitude of oscillation of the probe towards $A_{set}$. In other words, the z-feedback signal always tries to keep the amplitude of the probe at $A_{set}$. In reality however, the amplitude is basically never really $A_{set}$, as the microscope does not know what the topography looks like. The first feedback loop keeps the real imaging amplitude of the probe close to $A_{set}$, in a range "within the error of the first feedback loop operation". The difference between the real amplitude and $A_{set}$ depends on the speed of the first feedback loop and the corrugation of the sample, which is greater when the first feedback loop is slow (bad) or the sample corrugation strong (large hills)).

The steps c) and d) may be performed at each x-scan line retrace time.

A convenient way to trigger steps c) and d) is to use the scanning control signal that is used for displacing the probe along the x axis during the scanning to trigger the drift compensation state.

Such a scanning signal may be a triangular signal, with the x position of the probe being a linear function of the amplitude of the scanning signal. The retrace time may start when the x scanning signal derivative changes sign.

The method may comprise automatically generating from the x scanning signal a signal used to change the setpoint value of the first feedback loop.

In a preferred embodiment, a trigger signal for changing the setpoint value $A_{set}$ to the value $A_{set}+A_{mock}$ is sent to the first feedback-loop at the beginning of the retrace time of the scan line, this trigger signal being generated by converting the triangular x-scanning signal of the probe into a square wave with a differentiator.

For best operation of the AFM, the retraction of the probe for excitation adjustment in the drift compensation state should not be too far away from the sample to avoid loss of time travelling the probe away from the sample, but far enough so that there is no longer interaction of the probe with the sample.

Accordingly, $A_{set}$ lies preferably between 90% of $A_{free}$ and $A_{free}$, more preferably between 95% of $A_{free}$ and 99% of $A_{free}$.

Preferably, $A_{set}+A_{mock}$ is at least 5% larger than $A_{free}$, better being between 8 and 12% larger than $A_{free}$.

Preferably, $A_{free}$ ranges between 0.5 nm and 2 nm, better between 0.8 and 1.2 nm.

$A_{free}$, $A_{mock}$ and/or $A_{set}$ can be selected depending on the type of AFM used or the material of the sample.

$A_{set}$ may be sent to the first feedback loop as a voltage signal, the second feedback loop changing the setpoint value by adding a bias to the input voltage signal of the first feedback loop.

In a variant, the voltage signal at the input first feedback loop is substituted by a voltage selected so as to change the set point value to $A_{set}+A_{mock}$.

The movement of the probe in the x-y imaging plane may be controlled by an x-piezo and a y-piezo. The distance between the sample and the tip of the probe in the z direction may be controlled by a z-piezo, which is configured for moving the tip of the probe or a sample-stage along the z axis.

Preferably, the amplitude of free oscillation of the probe is detected at least ten times during the retrace time of a scan line. An average value of the detected amplitude of free oscillation may be calculated and compared to the set value $A_{free}$ to adjust the excitation signal.

Preferably, detection of the amplitude of free oscillation is performed for every scan line, which means that for example the z-piezo retracts the probe during the retrace time of every scan line to release the tip from the sample surface.

The scanning may be performed with different setpoint values $A_{set}$ at respective subregions of the sample.

The sample may be a biological material.

The method may be applied for estimating kinetic parameters related to protein-protein interactions.

The present invention also aims to provide an atomic force microscope (AFM), in particular for carrying out the method of the invention as defined above, comprising a probe displaceable relative to a sample along scan lines in an imaging x-y plane and along a z axis perpendicular to the x-y plane, the probe being configured for being moved forth and back during respective trace and retrace times of a scan line, and caused to oscillate by an excitation signal, a detector for measuring an amplitude of oscillation of the probe, a first feedback loop configured for generating a z feedback signal to displace the probe relative to the sample along the z axis to keep an amplitude of oscillation of the probe constant at a setpoint value $A_{set}$ during the trace time, and a second feedback loop configured for changing, in the first feedback loop, the setpoint value $A_{set}$ to a different value $A_{set}+A_{mock}$ during the retrace time so that the first feedback loop causes the probe to move away from the sample and oscillate free of interaction with the sample, and for adjusting an excitation signal of the probe to maintain the amplitude of free oscillation of the probe close to a set value $A_{free}$.

Preferably, the second feedback loop is configured for restoring the setpoint value $A_{set}$ in the first feedback loop after adjustment of the excitation signal of the probe.

The second feedback loop may comprise a differentiator configured for converting a triangular x-scanning signal of the probe into a square wave. The AFM may comprise a processor for receiving the square wave as a trigger signal for sending a setpoint value adjust signal to the first feedback loop.

The first feedback loop may comprise a proportional-integral-derivative controller (PID controller).

The processor may be configured for calculating an average value of the amplitude of free oscillation of the probe detected during the retrace time of a scan line, the adjustment of the amplitude of free oscillation being performed, for a scan line, at least on the basis of the comparison between the set value $A_{ire}$ and the average value detected.

Preferably, the AFM is a high-speed AFM, for example with a speed of scanning greater than 128 x-scan lines (fast scan axis) per second or greater than 1 image per second, but the method according to the invention may be implemented in any type of AFM.

Preferred exemplary embodiments of the invention are illustrated in the accompanying drawings in which like reference numerals represent like parts throughout, and in which:

FIG. 7a illustrates another example of the method of the invention and FIG. 7b shows images obtained in this example, and FIGS. 8 and 9 show results of the method illustrated in FIG. 7a.

Figure 1:
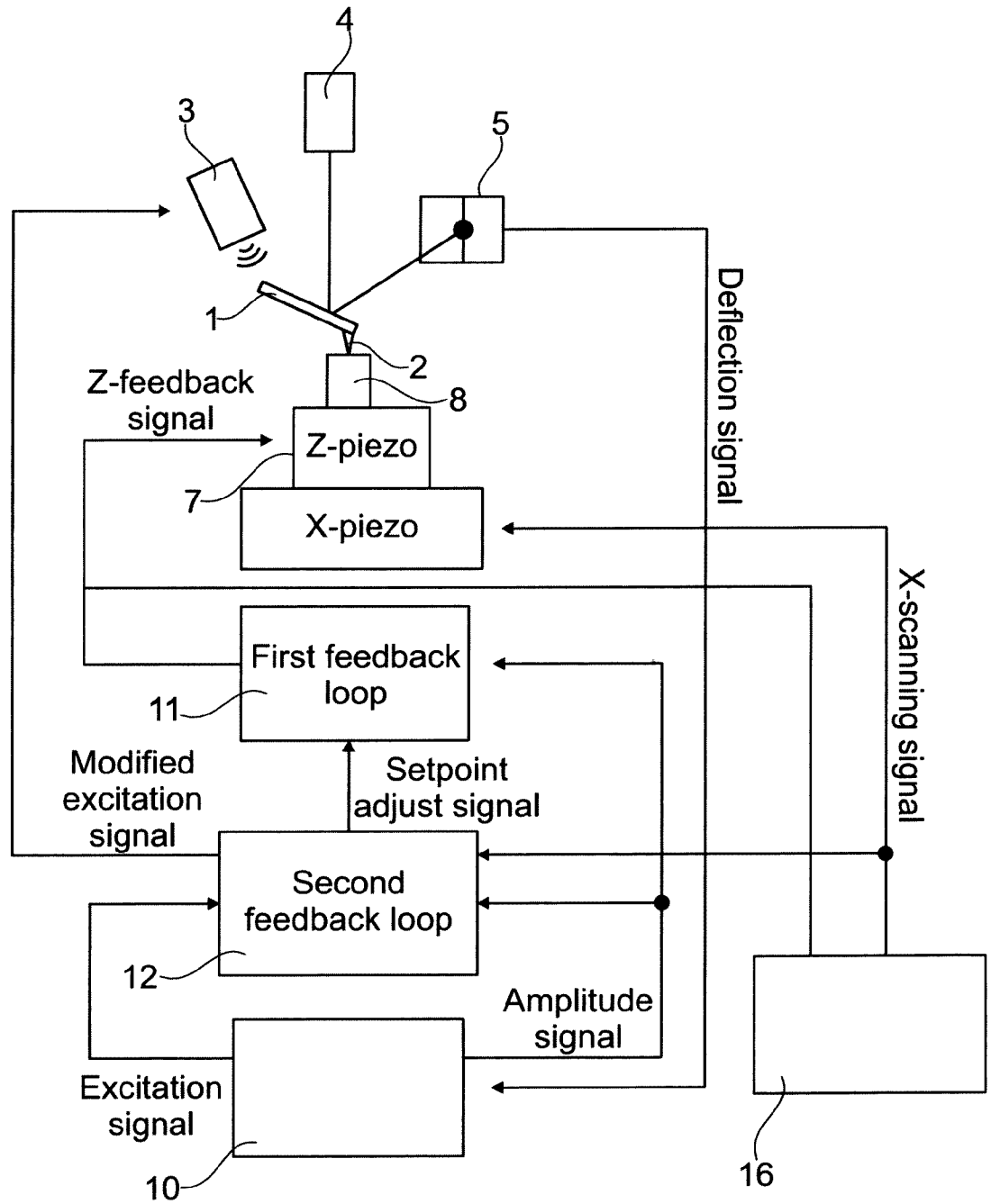
FIG. 1 is a schematic representation of a portion of an AFM according to the present invention.

An AFM in accordance with the invention, as illustrated in FIG. 1, comprises a probe carried by a support (not shown) and comprising a cantilever 1 and a tip 2 attached to a free end of the cantilever 1.

A sample (not shown) is mounted on a sample stage 8. An x-y-z drive 7 comprising a z-piezo, an x-piezo and a y-piezo (not shown) is used to displace the sample stage 8 with the sample in the x, y, and z directions with respect to the tip 2.

The AFM is connected to a processor such as a personal computer, which serves, among other things, to generate scanning signals to the probe. The same computer may also be used for analysis of the scanning data and image formation on the basis of the scanning data.

Although FIG. 1 shows the drive attached to the sample stage, the drive may also in a variant embodiment be attached to the probe, or independent drives may be attached to both, since it is the relative displacement of the sample and tip that needs to be controlled.

In tapping mode, the cantilever 1 is driven to oscillate up and down along the z-axis, by acoustic waves, at or near its resonance frequency. This oscillation is commonly achieved with an excitation piezo 3 in the cantilever support, but other possibilities do not go beyond the scope of the invention. The excitation piezo 3 may be a piezoelectric element.

The value of the amplitude of free oscillation $A_{free}$ when the probe is far away from the sample not to interact therewith is usually chosen to between less than 1 nm and 200 nm. When the sample consists of soft biological material, $A_{free}$ is preferably about 1 nm in order to avoid damaging the material.

When the tip 2 is driven by the z-piezo close to the surface of the sample, this causes interaction between the sample and the tip 2. This interaction causes the amplitude of the cantilever's oscillation to change (usually decrease) as the tip 2 gets closer to the sample. This change of the amplitude of oscillation may be detected by measuring the deflection of the cantilever 1.

As shown in FIG. 1, the cantilever-deflection measurement may be performed optically by a beam-deflection method. In such method, laser light from an emitter 4, for example a solid-state diode, is reflected off the back of the cantilever 1 and collected by a position sensitive detector (PSD) 5. The AFM comprises an amplitude detector 10 that receives the signal generated by the detector 5 and generates an amplitude signal transmitted to the first feedback loop. This signal is a voltage in the described embodiment.

The amplitude detector also generates an excitation signal for oscillating the probe.

When using the AFM to image the sample, the tip 2 is brought in interaction with the sample, and the sample is raster scanned along the x-y imaging plane.

The amplitude signal delivered by the amplitude detector 10 is used as an input parameter in a first electronic feedback loop 11 that controls the height z of the probe above the sample. The first feedback loop 11 comprises for example a PID controller.

As the probe scans over the sample, the first electronic feedback loop 11 adjusts the height z to maintain a user defined set cantilever oscillation amplitude, referred to as setpoint value $A_{set}$.

The first feedback loop 11 outputs a signal that controls the distance along the z axis between the probe support (not shown) and the sample stage 8.

As the probe is in an operation state and the sample is scanned, height variations of the sample due to its topography will tend to change the amplitude of oscillation of the probe which is detected thanks to the detector 5. The first feedback loop 11 reacts to adjust the height of the probe support via the z-feedback signal sent to the z-piezoso that the deflection of the cantilever 1 representative of the oscillation amplitude is kept constant and equal to the setpoint value $A_{set}$.

Typically, $A_{set}$ is chosen to be between 95% and 99% of the amplitude of free oscillation of the probe $A_n$.

The AFM further comprises a second feedback loop 12.

This second feedback loop 12 receives three input signals: (i) the excitation signal generated by the amplitude detector 10 for oscillating the probe, (ii) the same amplitude signal that the amplitude detector 10 sends to the first feedback loop 11 for controlling the distance along the z axis between the probe support and the sample stage 8, and (iii) the x-scanning signal that the computer 16 sends to the x-piezo to control the back and forth movement of the probe along the x-scan lines.

The second feedback loop 12 sends two output signals out: (i) a setpoint adjust signal to the first feedback loop 11 for inducing the z-piezo retraction for detection of the amplitude of free oscillation, and (ii) a modified excitation voltage to the excitation piezo 3.

Figure 3A:
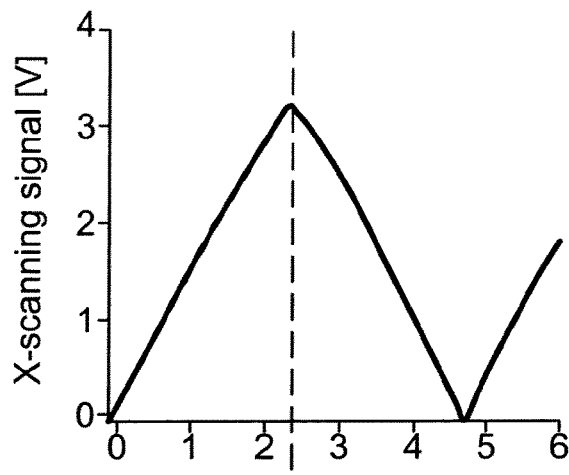
FIGS. 3a to 3c illustrate scan signals during free amplitude detection in a method according to the present invention.

The x-scanning signal is a triangular signal as shown in FIG. 3a and is converted into a square wave by a differentiator in the second feedback loop 12. This square wave is used as a trigger signal to detect the beginning of each retrace time.

This trigger signal is sent to a processor which generates in turn a setpoint adjust signal sent by the second feedback loop to the first feedback loop 11. This signal is a voltage of an amplitude chosen such that the setpoint value of the first feedback loop is changed from $A_{set}$ to a value $A_{set}+A_{mock}$ that is about 10% larger than $A_{free}$.

As a consequence, the PID controller of the first feedback loop drives away the tip from the sample and the probe is placed in a drift compensation state.

During this period of lift-off, the "actual" amplitude of free oscillation of the probe is detected for example about 10 times and an accurate average is calculated by the processor. The averaged value is compared to the set value $A_{free}$ and an altered excitation voltage signal is sent by the second feedback loop 12 to the excitation piezo 3 to compensate for any amplitude drift so the free amplitude remains constant and equal to $A_{free}$.

Before the retrace time ends, the setpoint value of the imaging amplitude is restored to the original value $A_{set}$, and the first feedback loop will automatically, via the z-feedback signal, bring the tip 2 back into interaction with the sample surface for next trace scan line.

The drift compensation is preferably carried out for every x-scan line, meaning that in a classical AFM the force exerted by the probe on the sample would be adjusted between one and ten times per second and in HS-AFM several hundreds of times per second.

In both cases, free amplitude drift occurs in the seconds to minutes range, and therefore the invention can be applied to any type of amplitude modulation AFM.

Figure 2:
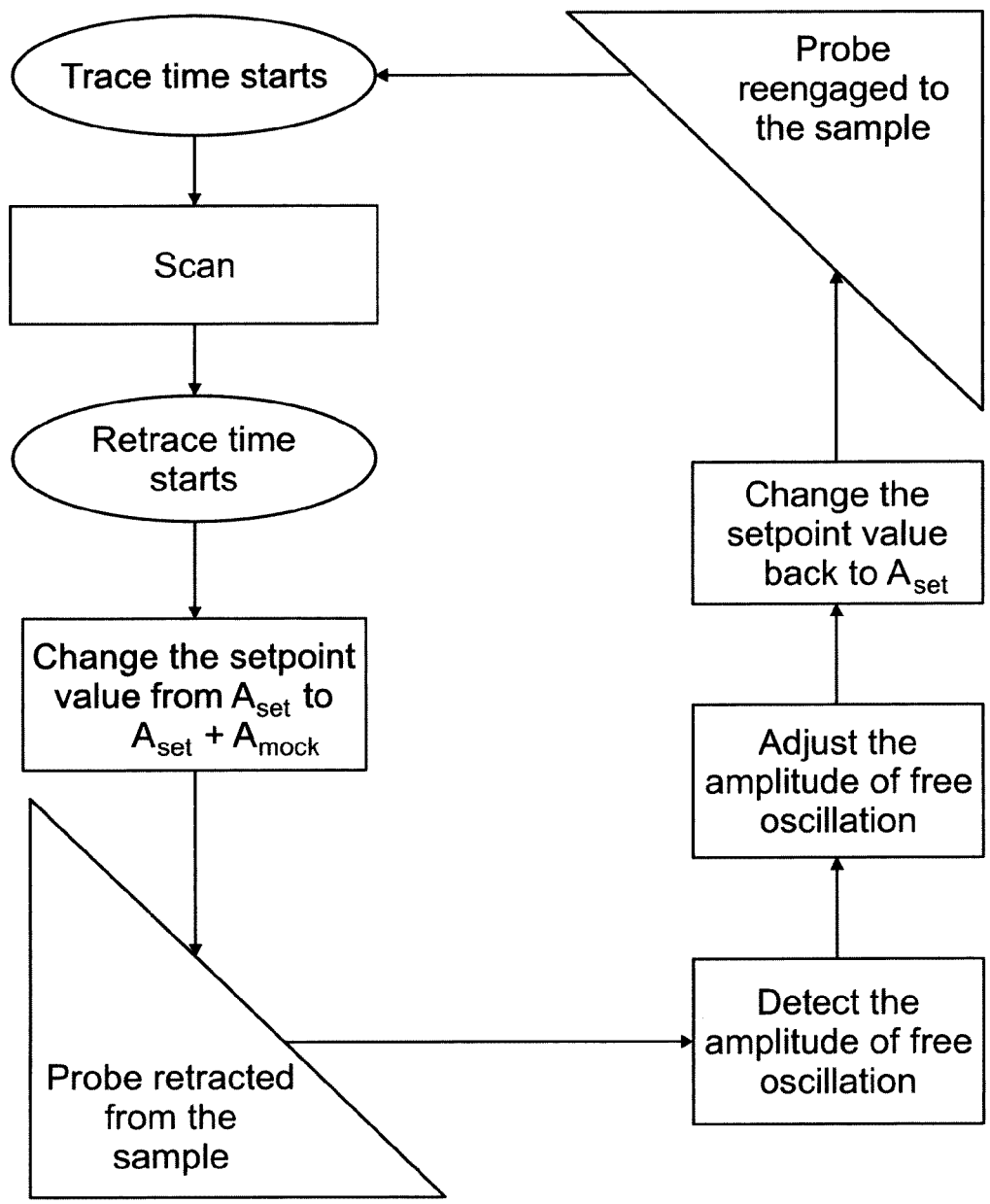
FIG. 2 is a flow chart representing an embodiment of the invention.

The flow chart of FIG. 2 illustrates, for an x-scan line, the sequence of operations performed by the AFM in accordance with the invention.

During image acquisition a triangular voltage signal as illustrated in FIG. 3*a* is sent to the x-piezo which leads to forth and back x scanning. In a method according to the invention, every time the x scanning 'turns around', i.e. the x-piezo voltage changes from increasing to decreasing values and the relative scan motion changes from left-right to right-left, a trigger signal is generated.

Figure 3B:
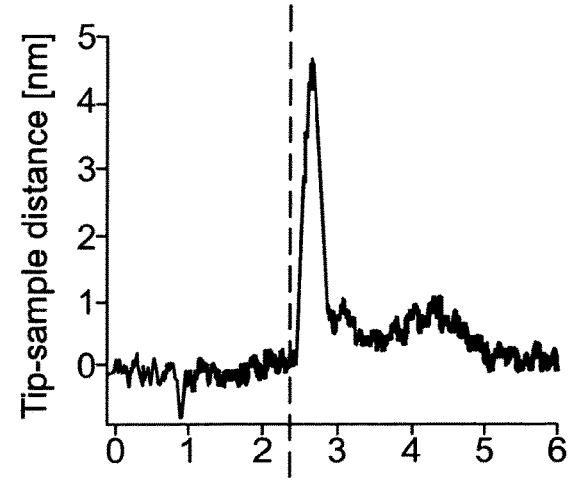

When the second feedback loop 12 receives this trigger signal, it sends the setpoint adjust signal to the first feedback loop 11. As a consequence, the z-piezo immediately retracts the probe to result in complete separation of the tip 2 from the sample surface. This is illustrated in FIG. 3*b* showing the tip-sample distance.

Figure 3C:
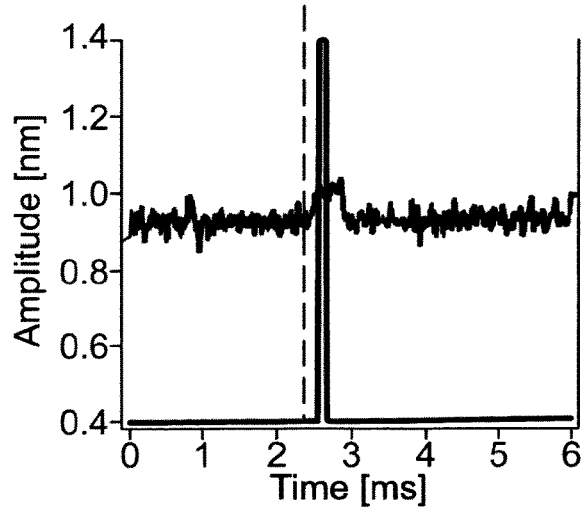

As illustrated in FIG. 3*c*, a short amplitude analysis window opens when the actual free amplitude is detected. Immediately after free amplitude detection, the second feedback loop reinitiates the first feedback loop with the imaging amplitude setpoint value $A_{set}$, smaller than $A_{free}$. The first feedback loop automatically drives the probe back into contact with the sample surface, before starting the next trace imaging fast scan line.

As a consequence of the performed free amplitude detection, the second feedback loop adjusts the excitation power that is sent to cantilever excitation piezo 3 to keep the amplitude of free oscillation substantially constant to the set value $A_{free}$.

EXAMPLES

Material and Methods:
High-Speed Atomic Force Microscopy (HS-AFM)

All images in the following examples were taken by amplitude modulation mode HS-AFM from the company RIBM, Japan. 8 μm short cantilevers Ultra-Short Cantilevers (USC) from the company NanoWorld, Switzerland with nominal spring constant k of 0.15 N/m, resonance frequency f(r) of 0.6 MHz and a quality factor Q of about 1.5 in buffer, were used. The HS-AFM fluid cell was connected to a buffer control system constituted by a constant pressure and flow pump from the company Harvard Instruments, USA connected over two silicon tubes to the fluid cell.

Example 1

The imaging conditions areas follows: the value of free amplitude $A_{free}$ is set to 1 nm, the setpoint value of the imaging amplitude $A_{set}$ is 90% of $A_{free}$, i.e. 0.9 nm. The frame size is 200×200 pixels and the scan speed is 1 frame per second. $A_{set}+A_{mock}$ is adjusted to 110% of $A_{free}$, leading to complete separation of tip and sample, here about 4.5 nm. Such distance is far enough from the surface to detect accurately the actual free amplitude, that is around 1 nm and close enough to the surface to reach contact before beginning of the next trace imaging scan line.

Figure 4A:
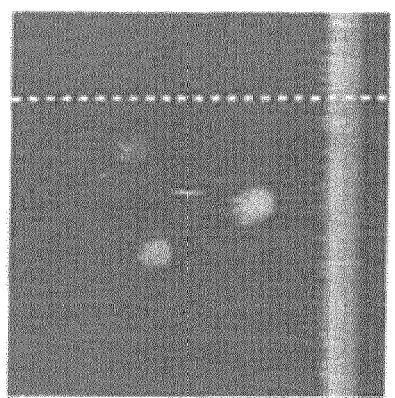
FIG. 4a is an image observed during retrace time of a scan line in a method according to the present invention and FIG. 4b shows a corresponding scan signal.

The retrace "image" illustrated in FIG. 4*a* shows a vertical bright line on the right edge. This line corresponds to the lift-off regime during which the amplitude of free oscillation is detected.

Figure 4B:
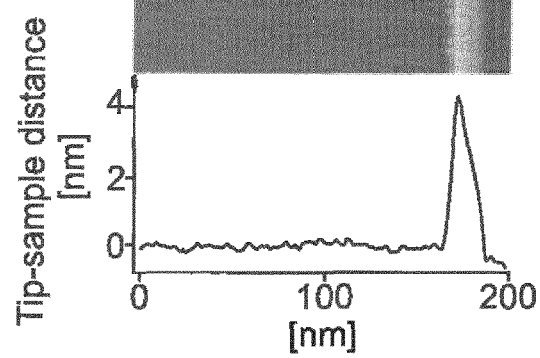

As illustrated in FIG. 4*b*, when the probe moves along an x-scan line (from right to left in the illustrated figure), the "tip-sample distance" reaches a peak.

Figures 5A, 5B, 5C, 5D, 5E, 5F:
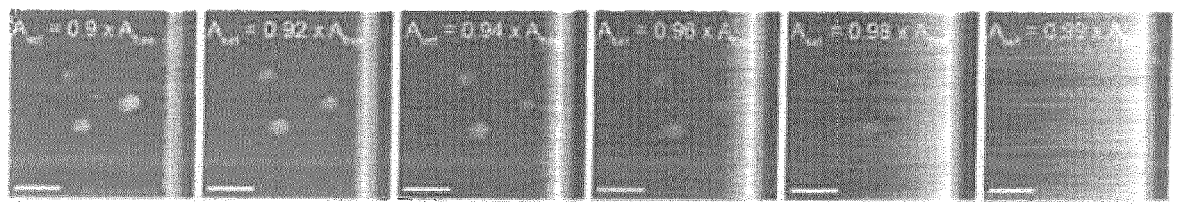
FIGS. 5a to 5f are images during retrace time of a scan line in a method according to the present invention with different values of $A_{set}$.

Tests are performed with $A_{set}$ chosen to 90%, 92%, 94%, 96% 98% or 99%. The results of the tests, illustrated respectively in FIGS. 5*a* to 5*f*, show that at $A_{set}$=98% of $A_{free}$, the return of the probe back to the sample is clearly visible but the tip gets readily back into contact to the sample surface before the next trace scan. Only when $A_{set}$=0.99 $A_{free}$, the return might eventually reach the next trace scan line, as can be seen in FIG. 5*f*.

However, typical amplitude modulation AFM is performed at about $A_{set}$=0.95 $A_{free}$, which is sufficiently for getting the tip readily back into contact to the sample surface before the next trace scan.

Example 2

Figure 6:
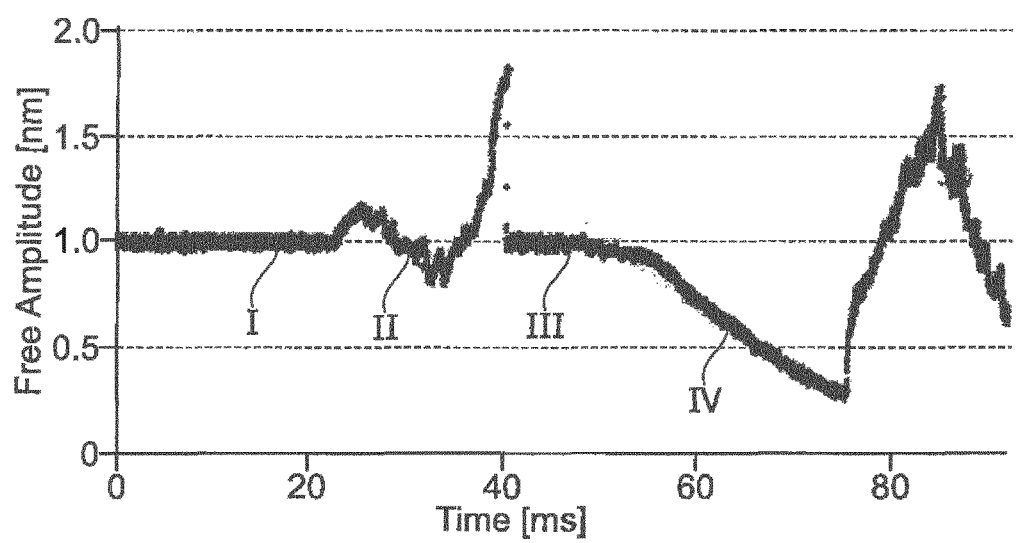
FIG. 6 illustrates the variation of the amplitude of free oscillation when the second feedback loop is respectively on and off.

A read out of the amplitude of free oscillation for 90 minutes is performed with the second feedback loop active (period I)-off (period ID-active (period III)-off (period IV). It can be seen in FIG. 6 that during periods I and III when the second feedback loop was active, the amplitude of free oscillation is maintained substantially constant, while free amplitude changes were detected during periods II and IV when the second feedback loop was switched off.

In this example, at around 40 minutes, the amplitude of free oscillation $A_{free}$ is raised from 1 nm to 1.8 nm within only 3 minutes. When the setpoint value of the imaging amplitude $A_{set}$ is kept constant at 0.95 nm, this free amplitude change corresponds to a force increase from about 55 pN to about 730 pN. The above mentioned average force is estimated following equation eq.1, where the cantilever spring constant k=0.15 N/m and the quality factor Q=1.5 in liquid.

$$\langle F \rangle \approx \frac{kA_{free}}{2Q}\left[1 - \left(\frac{A_{set}}{A_{free}}\right)^2\right]^{1/2} \quad \text{(eq. 1)}$$

A force of about 730 pN is excessive and damaging for fragile biological samples like proteins.

Detecting by eye changes in the "image appearance" and readjusting the setpoint force during imaging based on experience is undesirable. The operator's evaluation of the image derivations is a highly subjective parameter and implies that the operator knows what a "good representation" of the object under study was. Also, it is not exactly the same to scan at $A_{free}$ of 1 nm with $A_{set}$ of 0.95 nm or to scan at $A_{free}$ of 1.8 nm trying to adjust $A_{set}$ manually to reach similar image quality.

Example 3

In addition to free amplitude control for long-duration force-controlled imaging stabilization, the second feedback loop can equally be used to adjust the setpoint value of imaging amplitude $A_{set}$ together with $A_{free}$ in subregions of images.

To illustrate this function, the chaperonin GroEL double rings were imaged head-on adsorbed onto the mica support at four different well-defined imaging forces as shown in FIGS. 7a and 7b.

GroEL is a barrel-shaped chaperonin of about 14 nm in diameter and about 16 nm in height, consisting of two stacked rings (14 nm in diameter and 8 nm in height). Under many conditions the chaperonin adsorbs in end-up orientation on the mica surface. In GroEL, the two rings are only weakly bound and can be dissociated as function of the applied force and hence makes it possible to evaluate the sensitivity of the force controller.

Sample Preparation:

GroEL from the company Abcam, France was diluted in a buffer solution (20 mM Tris, pH 7.3, 30 mM KCl, 10 mM $MgCl_2$) to a final concentration of 100 nM. 1 ul of GroEL was put onto freshly cleaved mica for one hour at room temperature in a humid chamber. Then non-adsorbed GroEL was rinsed off with the same buffer.

Imaging:

The imaging parameters were 200×200pixels, 400×400 nm, 2 s/frame, and $A_{free}$=1 nm.

During the first 50 lines (part A), the setpoint value of imaging amplitude $A_{set}$=97% of $A_{free}$, the second 50 lines (part B) were imaged with $A_{set}$=95% of $A_{free}$ and the third 50 lines (part C) with $A_{set}$=93% of $A_{free}$ and the last 50 lines (part D) with $A_{set}$=91% of $A_{free}$.

In accordance with the present invention, $A_{free}$ was set to 1 nm and kept constant at this value. $A_{set}$ was modulated to the above-mentioned fractions of $A_{free}$ every 50 lines. The estimated average applied loading forces are 33 pN, 55 pN, 76 pN and 97 pN for each section, as estimated following equation eq.1.

Data Analysis:

HS-AFM images were analyzed by using the "particles analysis" plugin in the software Image J.

The results as illustrated in FIGS. 8 and 9 indicate that in the low-force regime (<76 pN) initial dissociation rate is force-independent and reports about the protein-stability, while the following dissociation rates seem to rather report protein dissection due to X-scanning process related lateral forces that is constant at low forces.

This suggests that amplitude modulation AFM should be operated at $A_{set} \geq 0.93 \times A_{free}$, (here $A_{free}$=1 nm and with optimized feed-back parameters) because under such low amplitude damping the vertically applied force does not cross-talk into lateral forces leading to destruction of the biological sample.

The e capacity of imaging at various forces in one image allows to test for ideal aging conditions within a single frame and hence avoid long force adjustment experiments that risk to contaminate the tip. Moreover, it makes it possible to analyze the effect of force on the biological sample and derive biophysical parameters from it.

The present invention is not limited to the embodiments and examples illustrated.

For example, oscillation of the cantilever may be achieved with an AC magnetic field (with magnetic cantilevers), piezoelectric cantilevers, or periodic heating with a modulated laser beam.

The invention claimed is:

1. A method of operating an atomic force microscope (AFM), comprising a probe displaceable relative to a sample along scan lines in an imaging x-y plane and along a z axis perpendicular to the x-y plane, the probe being moved forth and back during respective trace and retrace times of a scan line, and caused to oscillate by an excitation signal, the method comprising:
   a) setting a setpoint amplitude of a probe oscillation of the AFM at a value equal to $A_{set}$ and a parameter of free oscillation amplitude of the AFM at a value equal to $A_{free}$,
   b) during trace time, placing the probe in an operating state in which the probe oscillates along the z axis and interacts with the sample,
   c) generating a z feedback signal to displace the probe relative to the sample along the z axis to keep an amplitude of oscillation of the probe constant at the value of the setpoint amplitude $A_{set}$, the z feedback signal being generated by a first feedback loop at least on the basis of the value of the setpoint amplitude $A_{set}$ and having as input a measured amplitude value of oscillation of the probe,
   d) during retrace time, placing the probe in a drift compensation state by changing the value of the setpoint amplitude of the probe oscillation by sending a trigger signal to a processor, which generates a setpoint adjust signal, wherein the setpoint adjust signal is a voltage of an amplitude of probe oscillation chosen such that the setpoint amplitude of probe oscillation of the first feedback loop is changed from $A_{set}$ to a different value equal to $A_{set}+A_{mock}$, wherein $A_{set}+A_{mock}$ is larger than $A_{free}$, and wherein $A_{mock}$ is a mock amplitude value to be added to $A_{set}$ so that the z feedback signal being generated by the first feedback loop causes the probe to move away from the sample and oscillate free of interaction with the sample,
   e) detecting an amplitude of free oscillation of the probe and adjusting with a second feedback loop the excitation signal of the probe to maintain the amplitude of free oscillation of the probe close to the value of the parameter of free oscillation amplitude $A_{free}$,
   f) returning the probe in interaction with the sample for a next scan line by restoring value of the setpoint amplitude of the probe oscillation to a value equal to $A_{set}$ for the generation of the z feedback signal by the first feedback loop while applying the adjusted excitation signal of previous step to the probe.

2. The method according to the claim 1, wherein the trigger signal for changing the value of the setpoint amplitude of the probe oscillation from $A_{set}$ to the value $A_{set}+A_{mock}$ sent to the first feedback-loop at the beginning of the retrace time of the scan line is generated by converting a triangular x-scanning signal of the probe into a square wave by a differentiator.

3. The method according to claim 1, wherein $A_{set}$ is set to be between 90% of $A_{free}$ and $A_{free}$.

4. The method according to claim 1, wherein the value of the parameter of free oscillation amplitude $A_{free}$ is set between 0.5 nm and 2 nm.

5. The method according to claim 1, in which $A_{set}$ is sent to the first feedback loop as a voltage input signal, the second feedback loop generating the setpoint amplitude adjust voltage signal that adds the mock value $A_{mock}$ to $A_{set}$ for changing the value of the setpoint amplitude from $A_{set}$ to $A_{set}+A_{mock}$.

6. The method according to claim 1, in which $A_{set}$ is sent to the first feedback loop as a voltage input signal, the second feedback loop generating the setpoint amplitude adjust voltage signal that substitute to $A_{set}$ the value $A_{set}+A_{mock}$ for changing the value of the setpoint amplitude of the probe oscillation from $A_{set}$ to $A_{set}+A_{mock}$.

7. The method according to claim 1, the amplitude of free oscillation being detected at least ten times during of the retrace time of the scan line.

8. The method according to claim 7, an average value of the detected amplitude of free oscillation being calculated and compared to the set value $A_{free}$ for adjusting the amplitude of free oscillation.

9. The method according to claim 1, wherein detection of the amplitude of free oscillation is performed for every scan line.

10. The method according to claim 1, the scanning being performed with different values for of setpoint amplitude $A_{set}$ at respective subregions of the sample.

11. The method according to claim 1, being applied for estimating kinetic parameters related to protein-protein interactions.

12. A method of operating an atomic force microscope (AFM), comprising a probe displaceable relative to a sample along scan lines in an imaging x-y plane and along a z axis perpendicular to the x-y plane, the probe being moved forth and back during respective trace and retrace times of a scan line, and caused to oscillate by an excitation signal, the method comprising
 a) setting a setpoint amplitude of a probe oscillation of the AFM at a value equal to $A_{set}$ and a parameter of free oscillation amplitude of the AFM at a value equal to $A_{free}$,
 b) during trace time, placing the probe in an operating state in which the probe oscillates along the z axis and interacts with the sample,
 c) generating a z feedback signal to displace the probe relative to the sample along the z axis to keep an amplitude of oscillation of the probe constant at the value of the setpoint amplitude of the probe oscillation $A_{set}$, the z feedback signal being generated by a first feedback loop at least on the basis of the value of the setpoint amplitude of the probe oscillation $A_{set}$ and having as input a measured amplitude value of oscillation of the probe,
 d) during retrace time, placing the probe in a drift compensation state by changing the value of the setpoint amplitude of the probe oscillation by sending a trigger signal to a processor, which generates a setpoint adjust signal, wherein the setpoint adjust signal is a voltage of an amplitude of probe oscillation chosen such that the setpoint amplitude of probe oscillation of the first feedback loop is changed from $A_{set}$ to a different value equal to $A_{set}+A_{mock}$ which is larger than $A_{free}$, wherein $A_{mock}$ is a mock value to be added to $A_{set}$ so that the z feedback signal being generated by the first feedback loop causes the probe to move away from the sample and oscillate free of interaction with the sample,
 e) detecting an amplitude of free oscillation of the probe and adjusting with a second feedback loop the excitation signal of the probe to maintain the amplitude of free oscillation of the probe close to the value of the parameter of free oscillation amplitude $A_{free}$,
 f) returning the probe in interaction with the sample for a next scan line by restoring the value of the setpoint amplitude of the probe oscillation to a value equal to $A_{set}$ for the generation of the z feedback signal by the first feedback loop while applying the adjusted excitation signal of previous step to the probe,
 wherein $A_{set}+A_{mock}$ is at least 5% larger than $A_{free}$.

13. An atomic force microscope (AFM), comprising:
 a probe displaceable relative to a sample along scan lines in an imaging x-y plane and along a z axis perpendicular to the x-y plane, the probe being configured for being moved forth and back during respective trace and retrace times of a scan line, and caused to oscillate by an excitation signal,
 a detector for measuring an amplitude of oscillation of the probe,
 a first feedback loop configured for generating a z feedback signal to displace the probe relative to the sample along the z axis to keep an amplitude of oscillation of the probe constant at a value of the parameter of setpoint amplitude of the probe oscillation set to be equal to $A_{set}$ during the trace time, and
 a second feedback loop configured for changing, in the first feedback loop, the value of the setpoint amplitude of the probe oscillation by sending a trigger signal to a processor, which generates a setpoint adjust signal, wherein the setpoint adjust signal is a voltage of an amplitude of probe oscillation chosen such that the setpoint amplitude of probe oscillation changes $A_{set}$ to a different value $A_{set}+A_{mock}$ during the retrace time, wherein $A_{set}+A_{mock}$ is larger than $A_{free}$, and wherein $A_{mock}$ is a mock amplitude value to be added to $A_{set}$ so that the first feedback loop causes the probe to move away from the sample and oscillate free of interaction with the sample, the second feedback loop being configured for adjusting the excitation signal of the probe to maintain the amplitude of free oscillation of the probe close to a set value equal to the value of the parameter of amplitude of free oscillation set to be equal to $A_{free}$.

14. The atomic force microscope according to claim 13, comprising a differentiator configured for converting a triangular x-scanning signal of the probe into a square wave, and a processor configured for receiving the square wave as the trigger signal for sending the setpoint amplitude adjust signal to the first feedback loop.

15. The atomic force microscope according to claim 13, the second feedback loop being configured for restoring the value of the setpoint amplitude of the probe oscillation to $A_{set}$ in the first feedback loop after adjustment of the excitation signal of the probe.

16. The atomic force microscope according to claim 13, the first feedback loop comprising a proportional-integral-derivative controller (PID controller).

17. The atomic force microscope according to claim 13, being configured for calculating an average value of the amplitude of free oscillation detected during the retrace time of a scan line, the adjustment of the amplitude of free oscillation being performed, for a scan line, at least on the basis of the comparison between the set value $A_{free}$ and the average value detected.

* * * * *